United States Patent
Chan (10) Patent No.: US 10,128,488 B2
(45) Date of Patent: Nov. 13, 2018

(54) TYPE II CLATHRATES FOR RECHARGEABLE BATTERY ANODES

(71) Applicant: ARIZONA BOARD OF REGENTS, A BODY CORPORATE OF THE STATE OF ARIZONA ACTING FOR AND ON BEHALF OF ARIZONA STATE UNIVERSITY, Scottsdale, AZ (US)

(72) Inventor: Candace Chan, Phoenix, AZ (US)

(73) Assignee: Arizona Board Of Regents, A Body Corporate Of The State Of Arizona Acting For And On Behalf Of Arizona State University, Scottsdale, AZ (US)

( * ) Notice: Subject to any disclaimer, the term of this patent is extended or adjusted under 35 U.S.C. 154(b) by 466 days.

(21) Appl. No.: 14/768,692

(22) PCT Filed: Feb. 27, 2014

(86) PCT No.: PCT/US2014/019123
§ 371 (c)(1),
(2) Date: Aug. 18, 2015

(87) PCT Pub. No.: WO2014/134350
PCT Pub. Date: Sep. 4, 2014

(65) Prior Publication Data
US 2015/0380724 A1 Dec. 31, 2015

Related U.S. Application Data

(60) Provisional application No. 61/770,801, filed on Feb. 28, 2013.

(51) Int. Cl.
| H01M 4/131 | (2010.01) |
| H01M 4/58 | (2010.01) |
| H01M 10/0525 | (2010.01) |
| H01M 10/054 | (2010.01) |
| H01M 4/485 | (2010.01) |
| H01M 4/02 | (2006.01) |

(52) U.S. Cl.
CPC .......... *H01M 4/131* (2013.01); *H01M 4/485* (2013.01); *H01M 4/581* (2013.01); *H01M 10/054* (2013.01); *H01M 10/0525* (2013.01); *H01M 2004/027* (2013.01)

(58) Field of Classification Search
None
See application file for complete search history.

(56) References Cited

U.S. PATENT DOCUMENTS

| 3,459,500 A | 8/1969 | Segura et al. |
| 5,800,794 A | 9/1998 | Tanigaki et al. |
| 6,188,011 B1 | 2/2001 | Nolas et al. |
| 6,423,286 B1 | 7/2002 | Gryko |
| 6,461,581 B1 | 10/2002 | Eguchi et al. |
| 6,525,260 B2 | 2/2003 | Yamashita et al. |
| 6,797,199 B2 | 9/2004 | Eguchi et al. |
| 7,534,414 B2 | 5/2009 | Nolas et al. |
| 8,722,247 B2 | 5/2014 | Miller et al. |
| 8,906,551 B2 | 12/2014 | Chan et al. |
| 2003/0197156 A1 | 10/2003 | Eguchi et al. |
| 2008/0226836 A1 | 9/2008 | Nolas et al. |
| 2009/0263958 A1 | 10/2009 | Nolas et al. |
| 2011/0226299 A1 | 9/2011 | Makansi |
| 2011/0253205 A1 | 10/2011 | Grossman et al. |
| 2012/0021283 A1 | 1/2012 | Chan et al. |
| 2012/0295160 A1 | 11/2012 | Miller et al. |
| 2013/0280609 A1* | 10/2013 | Chan .................. C01B 33/00 429/218.1 |

FOREIGN PATENT DOCUMENTS

| WO | 2013158307 A1 | 10/2013 |
| WO | 2014134350 | 9/2014 |

OTHER PUBLICATIONS

Langer et al., "Electrochemical Lithiation of Silicon Clathrate-II." Journal of the Electrochemical Society, 159 (8) A1318-A1322 (2012).*
K.S. Chan et al.,"Synthesis and Characterization of Silicon Clathrates for Anode Applications in Lithium-Ion Batteries", DOE Annual Merit Review, Washington DC, May 14-18, 2012, 26 pages.
J. Yang et al., "Silicon clathrates as anode materials for lithium ion batteries?", J. Mater. Chem. A 1, pp. 7782-7789, 2013.
N. Tsujii et al., "Phase stability and chemical composition dependence of the thermoelectric properties of the type-I clathrate Ba8AlxSi46-x (8<=x<=15)", Journal of Solid State Chemistry 184, pp. 1293-1303, 2011.
N.A. Borsch et al., "Electronic Structure and Spectral Characteristics of Zn Substituted Clathrate Silicides", Semiconductors, vol. 45, No. 6, pp. 713-723, 2011.

(Continued)

*Primary Examiner* — Alix E Eggerding
(74) *Attorney, Agent, or Firm* — Fish & Richardson P.C.

(57) ABSTRACT

An anode for a rechargeable battery includes a Type II clathrate having the formula $M_xX_{136}$, where a cage structure is formed by X, M represents one or more guest ions, and $0<x<24$. When $x=0$, no guest ion is present in the cage structure. X may be Si, Ge, Sn, or a combination thereof. M may be an ion of Na, K, Rb, Cs, Ba, Sr, Ca, Cl, Br, I, Eu, P, Te, Li, Mg, or a combination thereof. A rechargeable battery including the anode (e.g., as an anode) includes a cathode and an electrolyte in contact with the anode and the cathode. Forming the anode may include preparing a composition including the Type II clathrate contacting the composition with a current collector to form the anode. Guest ions may be electrochemically inserted and removed from the cage structure during operation of the rechargeable battery.

22 Claims, 7 Drawing Sheets

(56) References Cited

OTHER PUBLICATIONS

M. Beekman et al., "Synthesis and thermal conductivity of type II silicon clathrates", Physica B: Condensed Matter, vol. 383, No. 1, pp. 111-114, 2006.

T. Langer et al., "Electrochemical Lithiation of Silicon Clathrate-II", Journal of The Electrochemical Society, 159 (8) A1318-A1322, 2012.

Authorized Officer Nora Lindner, International Preliminary Report on Patentability for International Application No. PCT/US2014/019123, dated Sep. 11, 2015, 6 pages.

Authorized Officer Lee W. Young, International Search Report and Written Opinion for International Application No. PCT/US2014/019123, dated Aug. 11, 2014, 11 pages.

S. Bobev et al. "Synthesis and characterization of stable stoichiometric clathrates of silicon and germanium: cs8Na16Si136 and Cs8Na16Ge136," J. Am. Chem. Soc. 121, pp. 3795-3796, 1999.

J. P. Perdew et al., "Generalized Gradient Approximation Made Simple," Phys. Rev. Lett. 77 (18), Oct. 1996, pp. 3865-3868.

G. Kresse et al., "From ultrasoft pseudopotentials to the projector augmented-wave method," Phys. Rev. B 59 (3), Jan. 1999, pp. 1758-1775.

Nicholas A. Wagner et al., "Electrochemical Cycling of Sodium-Filled Silicon Clathrate," ChemElectroChem 1 (2), Feb. 2014, pp. 347-353.

T. Rachi et al., "Preparation and electronic states of Na16Ba8Si136 clathrate," Chem. Phys. Lett. 409, pp. 48-51, 2005.

G. Kresse et al., "Efficient iterative schemes for ab initio total-energy calculations using a plane-wave basis set," Phys. Rev. B 54 (16), pp. 11 169-11 186, Oct. 15, 1996.

International Search Report and Written Opinion for PCT/US14/19123 dated Aug. 11, 2014. 11 pages.

Jan Gryko et al., "Low-density framework form of crystalline silicon with a wide optical band gap," Physical Review B (Condensed Matter and Materials Physics), vol. 62, No. 12, Sep. 15, 2000—II, pp. R7707-R7710.

Abdelaziz Ammar et al., "On the clathrate form of elemental silicon, Si136: preparation and characterisation of NaxSi136 (x→0)," Solid State Sciences, vol. 6, Issue 5, May 2004, pp. 393-400.

\* cited by examiner

TYPE II CLATHRATES FOR RECHARGEABLE BATTERY ANODES

CROSS-REFERENCE TO RELATED APPLICATION APPLICATIONS

This application is a U.S. National Phase Application of International Patent Application No. PCT/US2014/019123 filed Feb. 27, 2014, which claims priority to the benefit of U.S. Application Ser. No. 61/770,801 entitled "TYPE II CLATHRATES FOR RECHARGEABLE BATTERY ANODES," filed Feb. 28, 2013, the contents of both of which are incorporated herein by reference in their entirety.

STATEMENT OF GOVERNMENT INTEREST

This invention was made with government support under 1206795 awarded by the National Science Foundation. The government has certain rights in the invention.

FIELD OF THE INVENTION

This invention relates to Type II clathrates for rechargeable battery anodes and rechargeable battery anodes including Type II clathrates.

BACKGROUND

High capacity and high rate rechargeable batteries with low cost and improved safety characteristics constitute a major requirement for electric vehicles, portable electronics, and other energy storage applications. Year-to-year electrochemical performance improvements in lithium-ion batteries (LIBs) are typically limited to 3-4%, with a major bottleneck being the lack of appropriate materials to satisfy the energy and power density requirements. Progress in nanostructured anodes has improved the potential of the practically achievable capacity and rates. For example, high capacity anodes such as silicon, which have been studied since the 1980s, have been found to overcome structural degradation problems through the use of nanowire morphologies. However, batteries utilizing silicon anodes can still only achieve a 30% gain in energy density due to the low capacity of the cathode: current cathodes have practical capacities of 150-180 mAh/g.

Both diamond cubic and amorphous silicon can reversibly alloy with Li electrochemically, making silicon a promising high energy density anode for Li-ion batteries. The theoretical charge storage capacity for silicon is about 4000 mAh/g, more than an order of magnitude higher than for graphite, the existing Li-ion battery anode. However, the structural changes that occur during this process results in the formation of a great deal of stresses than can lead to pulverization of the silicon. This is attributed to a 300% change in volume between the unlithiated and lithiated phases. The use of nanostructuring has been applied to allow the silicon to undergo this volume change without fracturing or pulverizing. This concept has been demonstrated with various silicon nanostructures. However, this strategy relies on the use of engineered space within or in between the nanostructured silicon, which effectively gives it space to expand and contract without impinging on itself. Agglomeration and degradation of the engineered structure after many lithiation/delithiation cycles may lower the effectiveness of this strategy. The nanostructuring also does not address the volume expansion of silicon upon lithiation.

SUMMARY

In one aspect, an anode for a rechargeable battery includes a Type II clathrate having the formula $M_xX_{136}$, where a cage structure is formed by X, M represents one or more guest ions, and $0 \leq x \leq 24$. In some cases, $x=0$ and no guest ion is present.

In another aspect, forming an anode for a rechargeable battery includes preparing a composition including a Type II clathrate having the formula $M_xX_{136}$, where the cage structure is formed by X, M represents one or more guest ions, and $0 \leq x \leq 24$. The composition is contacted with a current collector to form the anode.

In yet another aspect, a guest ion Y is electrochemically inserted into a cage structure of a Type II clathrate having the formula $M_xX_{136}$ to yield a Type II clathrate having the formula $M_xYX_{136}$, where the cage structure is formed by X, M represents one or more guest ions, and $0 \leq x \leq 24$. Y is electrochemically removed from the Type II clathrate. When Y is a lithium ion, electrochemically inserting and removing comprise lithiation and delithiation, respectively.

Implementations may include one or more of the following features.

X may be selected from the group consisting of Si, Ge, and Sn. M may be an ion selected from the group consisting of ions of Na, K, Rb, Cs, Ba, Sr, Ca, Cl, Br, I, Eu, P, Te, Li, and Mg. In some cases, $M_xX_{136}$ represents $A_yB_zX_{136}$, wherein A and B represent different guest ions, $1 \leq y+z \leq 24$, $y \geq 1$, and $x \geq 1$. A and B may be independently selected from the group consisting of ions of Na, K, Rb, Cs, Ba, Sr, Ca, Cl, Br, I, Eu, P, Te, Li, and Mg. Y may be selected from the group consisting of sodium ions, magnesium ions, and lithium ions.

An anode may be formed by one or more of the above aspects. A rechargeable battery may include the anode of any of the above aspects, the rechargeable battery further including a cathode and an electrolyte in contact with the anode and the cathode. The rechargeable battery may be a rechargeable sodium-ion battery, a rechargeable magnesium-ion battery, or a rechargeable lithium-ion battery. A device may include the rechargeable battery of any of the above implementations.

The anodes, batteries, and devices described herein provide advantages including insertion of multiple guest ions (e.g., up to 16 or 24) into the anode material without significant changes in lattice constant or clathrate structure, thus allowing extended cycling including, for example, lithiation and delithiation without structural damage of the anode material.

These general and specific aspects may be implemented using a device, system or method, or any combination of devices, systems, or methods. The details of one or more embodiments are set forth in the accompanying drawings and the description below. Other features, objects, and advantages will be apparent from the description and drawings, and from the claims.

BRIEF DESCRIPTION OF THE DRAWINGS

FIGS. 5A-5D show differential charge plots of the clathrate compared to c-Si and amorphous Si (a-Si) using a 25 µA mg$^{-1}$ (FIGS. 5A and 5B) and a 5 µA mg$^{-1}$ (FIGS. 5C and 5D) threshold current. FIGS. 5A and 5C are the first cycle and FIGS. 5B and 5D are the second cycle. The values of the differential charge were scaled to facilitate comparison.

FIGS. 7A-7E depict structures of $Li_{16}Na_{24}Si_{136}$ calculated by density functional theory (DFT). FIGS. 7A-7C depict $Li_{16}Na_{24}Si_{136}$ with Li in 16$d$ sites.

DETAILED DESCRIPTION

Figure 1A:
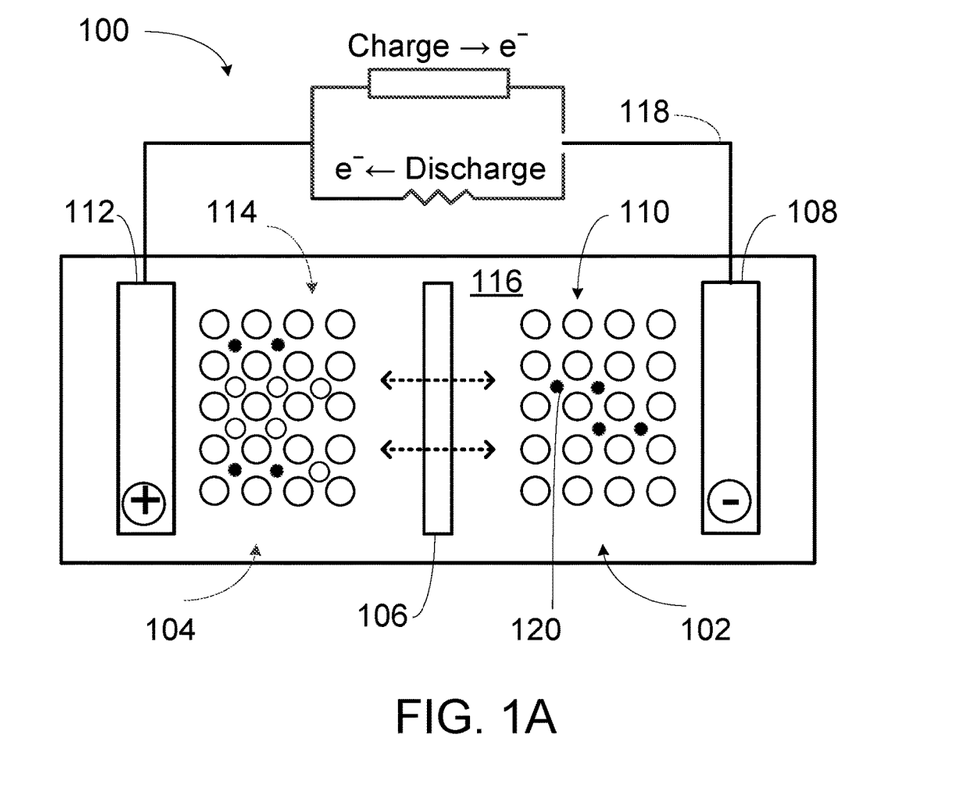
FIG. 1A depicts a rechargeable battery.
Figure 1B:
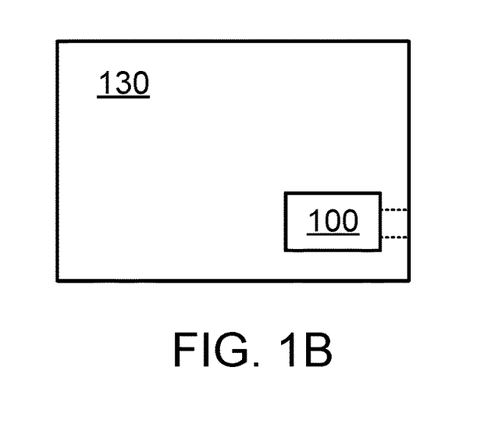
FIG. 1B depicts a device including a rechargeable battery.

As used herein, "rechargeable batteries" generally refers to sodium-ion, magnesium-ion, and lithium-ion batteries. As an example of a rechargeable battery, FIG. 1A depicts lithium-ion battery (LIB) 100 having anode 102 and cathode 104. Anode 102 and cathode 104 are separated by separator 106. Anode 102 includes anode collector 108 and anode material 110 in contact with the anode collector. Cathode 104 includes cathode collector 112 and cathode material 114 in contact with the cathode collector. Electrolyte 116 is in contact with anode material 110 and cathode material 114. Anode collector 108 and cathode collector 112 are electrically coupled via closed external circuit 118. Anode material 110 and cathode material 114 are materials into which, and from which, lithium ions 120 can migrate. During insertion (or intercalation) lithium ions move into the electrode (anode or cathode) material. During extraction (or deintercalation), the reverse process, lithium ions move out of the electrode (anode or cathode) material. When a LIB is discharging, lithium ions are extracted from the anode material and inserted into the cathode material. When the cell is charging, lithium ions are extracted from the cathode material and inserted into the anode material. The arrows in FIG. 1A depict movement of lithium ions through separator 106 during charging and discharging. FIG. 1B depicts device 130 including LIB 100. Device 130 may be, for example, an electric vehicle, an electronic device (e.g., a portable electronic device such as a cellular telephone, a tablet or laptop computer, etc.), or the like.

As described herein, anode material 110 for LIB anode 102 includes Type II clathrate materials having the general formula $M_xX_{136}$, in which the cage structure is formed by X, and M represents one or more guest ions, and $0 \leq x \leq 24$. When x=0, no guest ion is present in the cage structure. X is selected from Si, Ge, Sn, or a combination thereof, and M represents one or more ions such as, for example, ions of Na, K, Rb, Cs, Ba, Sr, Ca, Cl, Br, I, Eu, P, Te, Li, or Mg. Examples include $M_xX_{136}$ (i.e., one type of guest ion) as well as $A_yB_zX_{136}$ (i.e., two different guest ions A and B, with $2 \leq y+z \leq 24$, $y \geq 1$, and $z \geq 1$).

Figure 2A:
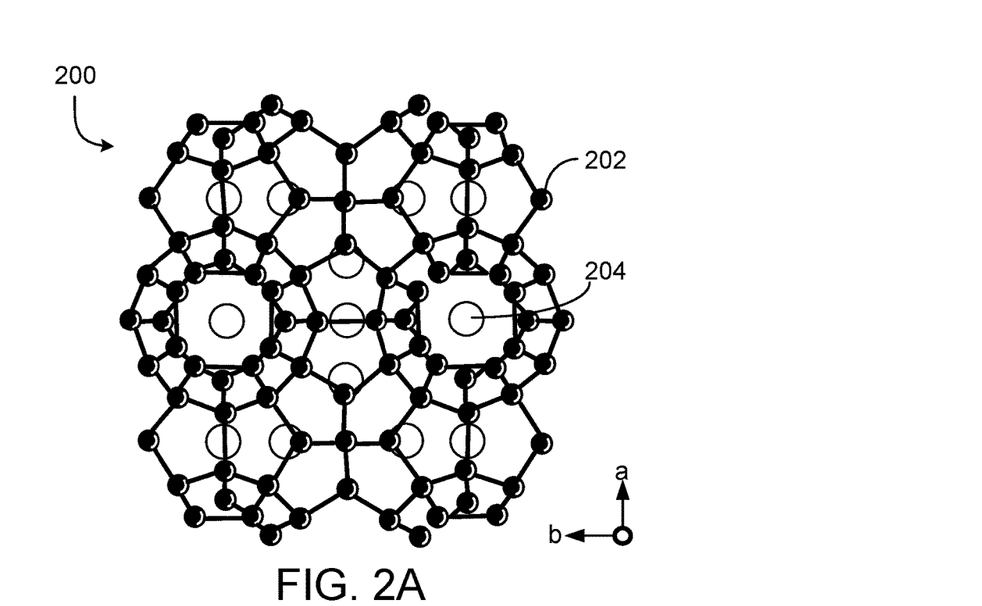
FIGS. 2A and 2B depict the crystal structure of Type I and Type II clathrates, respectively.

Type I clathrates of the form $M_8Si_{46}$, where M is a guest ion intercalated into the structure, are made of two pentagonal dodecahedra ($Si_{20}$ cages) and six tetrakaidecahedra ($Si_{24}$ cages) per unit cell and crystallize in the Pm$\bar{3}$n space group. Unit cell 200 of a Type I clathrate is depicted in FIG. 2A, with cage atoms 202 and guest ions 204. Type I clathrates are described in U.S. Patent Publication Nos. 2012/0021283, 2012/0295160, and 2013/0280609, all of which are incorporated herein by reference.

Figure 2B:
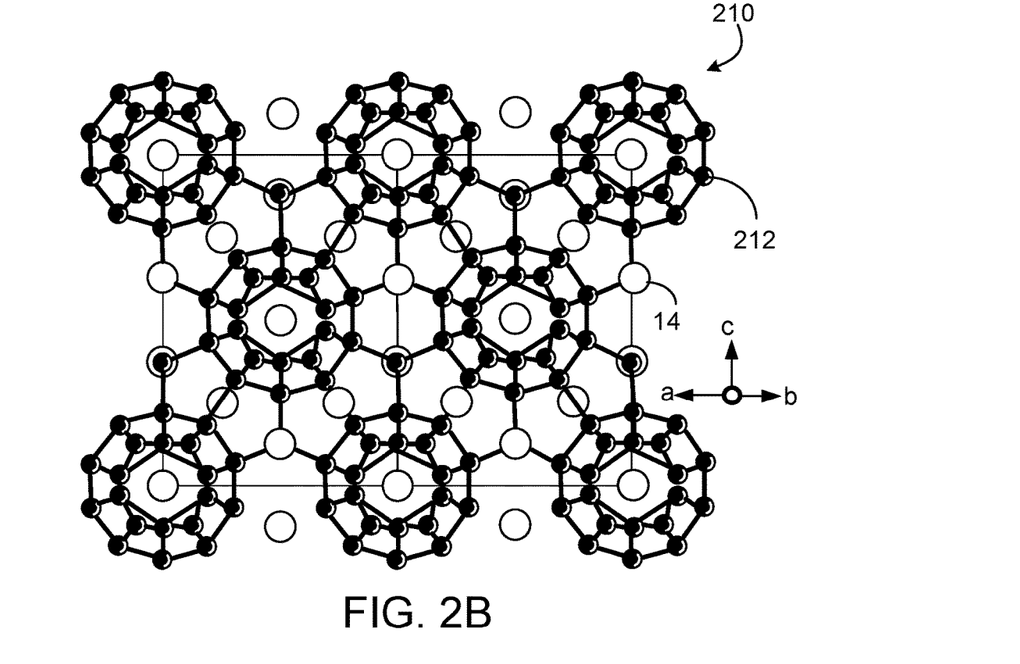

Type II clathrates of the form $M_xSi_{136}$ ($0 \leq x \leq 24$), are made of sixteen pentagonal dodecahedra plus eight hexakaidecahedra ($Si_{28}$ cages) per unit cell and crystallize in the Fd$\bar{3}$m space group. FIG. 2B depicts a Type II clathrate unit cell 210 of the form $M_xX_{136}$, with cage atoms 212 and guest ions 214. Guest ions 214 typically occupy interstitial areas in the polyhedral, but also may be weakly bound to the cages. The cage structure of Type II clathrates is advantageous for rechargeable battery electrodes, since ions (e.g., lithium, magnesium, sodium) can move in and out of the structure.

Type II clathrates described herein are able to withstand structural changes that accompany ion intercalation and de-intercalation with each charge/discharge cycle. The cage size in these clathrates is believed to be influenced more by the cage atoms 202 than the guest ions 204. For instance, there is only a 0.5% increase in the unit cell edge when increasing x from 4 to 23 in $Na_xS_{136}$, suggesting that a large number of guest ions can be inserted and removed from Type II clathrates with very little structural change and corresponding stresses. Silicon clathrates are also stable under pressure and have a large energy barrier for transformation to other phases. Since the compressive and tensile stresses experienced by rechargeable battery electrodes are high, structural stability is advantageous. In addition, with the guest atoms trapped inside the center of the cages, the Type II clathrates are relatively insensitive to moisture, water, and most acids. Mixed guest ions for Type II clathrates of the form $A_8B_{16}Si_{136}$ have been synthesized by using the concept that the cages that house A and B are different dimensions, and stabilization of the structure requires different guest ions. Tuning the physical and electrochemical properties of Type II clathrates may be achieved by the use of different guest ions in different cages.

Type II clathrates depicted in FIG. 2B have been synthesized via the decomposition of Zintl compounds and spark plasma treatment of sodium monosilicide. The electronic properties of these clathrates can be changed by doping with various metal ions, including alkali metals. Type II clathrates with mixed guest ions have also been made (e.g., $Na_{16}Ba_8Si_{136}$, T. Rachi et al., Chem. Phys. Lett. 409, 48-51 (2005)), facilitated by the difference in cavity sizes for the $Si_{20}$ and $Si_{28}$ cages.

As shown in Table 1 below, the Type II clathrates shown in FIG. 2B have larger cavity sizes than these Type I clathrates, which may allow for the incorporation of more guest ions than Type I clathrate based, for example, on ion sizes shown in Table 2. The structural differences between Type I and Type II clathrates may affect the electrochemical properties and storage capacities for guest ions. Unlike Type I clathrates, empty Type II clathrates are known (i.e., x=0). From an energy density standpoint, Type II clathrates may be better for energy storage applications since the mass of inactive material is lowered. More so than in Type I clathrates, the large difference in the cage sizes in Type II clathrates can allow for more diverse structures.

TABLE 1

Cavity sizes in silicon clathrates (S. Bobev et al., J. Am. Chem. Soc. 1999, 121, 3795-3796).

| Clathrate Type | Cavity size (Å) of Si cage | | |
|---|---|---|---|
| | $Si_{20}$ | $Si_{24}$ | $Si_{28}$ |
| Type I ($Si_{46}$) | 1.18 | 1.34 | — |
| Type II ($Si_{136}$) | 1.048 | — | 1.845 |

TABLE 2

Ionic Radii of alkali and alkaline ions (Bobev et al.).

| Alkali ion | Ionic Radius (Å) | Alkaline ion | Ionic Radius (Å) |
|---|---|---|---|
| $Li^+$ | 0.60 | $Mg^{2+}$ | 0.65 |
| $Na^+$ | 0.95 | $Ca^{2+}$ | 0.99 |
| $K^+$ | 1.33 | $Sr^{2+}$ | 1.13 |
| $Rb^+$ | 1.48 | $Ba^{2+}$ | 1.35 |
| $Cs^+$ | 1.69 | | |

Application of a Type II clathrate-based anode in lithium-ion batteries may provide a much higher energy density (4161 mAh/g, 460 Wh/kg, 2100 Wh/L) when paired with a $LiMn_2O_4$ cathode) than graphite (372 mAh/g, 386 Wh/kg, 1441 Wh/L), but may demonstrate less lithiation strain and volume changes, which could lead to improved cycle life and capacity retention. The presence of Na guest ions in the Type II clathrate may also be exploited in anodes for sodium and magnesium batteries.

Example

Si clathrate with Na guest ions was synthesized from the thermal decomposition of NaSi Zintl compound as described, for example, in G. K. Ramachandran et al., J. Solid State Chem. 1999, 145, 716-730, which is incorporated herein by reference. NaSi was purchased from SiGNa Chemistry and dried at 100° C. to remove adsorbed moisture. The NaSi was loaded into a h-BN crucible, then placed in a quartz tube and heated in a tube furnace under continuous vacuum evacuation (~$10^{-4}$ Torr). The sample was heated to 340° C. (ramp rate of 10.5° C./min) and held for 30 minutes, then ramped using the same rate to 420° C. and held for 18 hours. After 18 hours, the furnace was turned off while the sample remained under continuous vacuum for 6 hours to remove Na vapor and enable formation of more Type II clathrate. After the synthesis, the powder was quenched successively with toluene, isopropanol, ethanol, and water to remove any unreacted Na. To remove unreacted silicon, the powder was treated with 1 M NaOH for 8 hours.

Powder X-ray diffraction (XRD) was performed using CuKα radiation on a PANalytical X'Pert Pro diffractometer. Structure refinement of the XRD data was performed using Panalytical's X'Pert HighScore Plus software. XRD patterns were indexed to structures for Type I and Type II clathrate from Ramachandran et al. and P. Melinon. et al., Phys. Rev. B 1999, 59, 10099. XRD measurements on electrodes after electrochemical cycling were performed by washing the electrode with hexanes after cell disassembly. Peak positions and intensities were normalized to the reflections originating from the Cu foil substrate. Scanning electron microscopy (SEM) and energy-dispersive X-ray spectroscopy (EDS) were performed on a FEI XL30 ESEM-FEG. EDS was performed on 14 different particles in order to obtain an average composition.

Clathrate powder was mixed with carbon black (Timcal Super C45) and polyvinylidene difluoride (PVDF) in an 80:10:10 weight ratio and dissolved in N-methyl-2-pyrrolidone. This slurry was coated onto copper foil with a Meyer rod and dried at 100° C. The mass of the coating was determined using a microbalance (Mettler-Toledo, UMX2). Pouch cells were assembled in an Ar-filled glovebox using Li metal foil as the counter electrode, Celgard 3401 separator, and 1 M $LiPF_6$ in 1:1 mixture of ethylene carbonate and diethylecarbonate (Novolyte). The cells were tested using potentiodynamic cycling to perform electrochemical potential spectroscopy from 2-0.01 V vs. $Li/Li^+$ with a 5 mV potential step amplitude and threshold current of either 5 or 25 µA/mg based on the mass of the clathrate. For preparing samples for ex situ XRD analysis after lithiation and delithiation, galvanostatic testing using a 25 µA/mg current density was performed.

Figure 3:
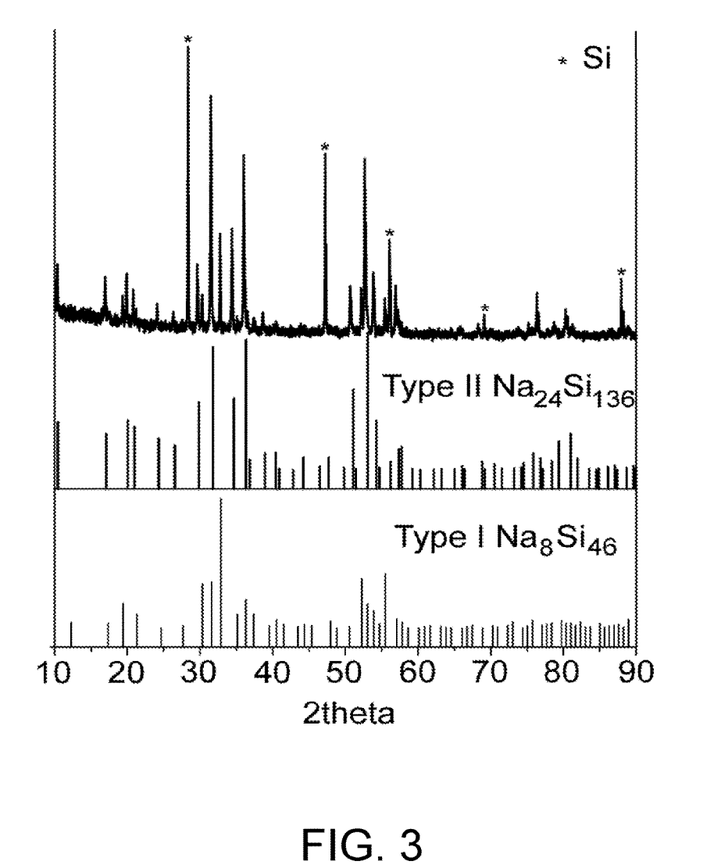
FIG. 3 shows an X-ray diffraction (XRD) pattern of the clathrate prepared as described in the Example, as well as reference XRD patterns for $Na_8Si_{46}$ and $Na_{24}Si_{136}$. Peaks from cubic Si (c-Si) are marked with asterisks.

The upper pane of FIG. 3 shows the powder XRD pattern of the as-made product, indicating a mixture of Type I ($Na_8Si_{46}$) and Type II ($Na_xSi_{136}$ 1≤x≤24) silicon clathrate, plus unreacted diamond cubic Si (c-Si). The middle and lower panes show reference patterns for $Na_8Si_{46}$ (Ramachandran et al.) and $Na_{24}Si_{136}$ (Melinon et al.), respectively. After treatment with NaOH, the c-Si peaks were absent from the XRD pattern, leaving only the peaks from the clathrates. The phase fraction as determined using Rietveld analysis showed the powder was composed of about 80% Type II clathrate and 20% of Type I.

Scanning electron microscopy (SEM) imaging revealed that the particles were approximately 1-5 µm in diameter. Energy-dispersive X-ray spectroscopy (EDS) analysis showed an average composition of 14.4 at % Na and 85.6 at % Si with a standard deviation of 3.2%. This corresponds to a Na:Si ratio of 0.169, which is in close agreement with the ratios in $Na_8Si_{46}$ and $Na_{24}Si_{136}$, suggesting that the Na sites in the clathrates were almost fully occupied. The powders were mixed into slurries with carbon black and polyvinylidene difluoride (PVDF) binder, then coated onto Cu foil. SEM images of the coated films showed that the carbon black formed a conducting network around the clathrate particles.

Figure 4A:
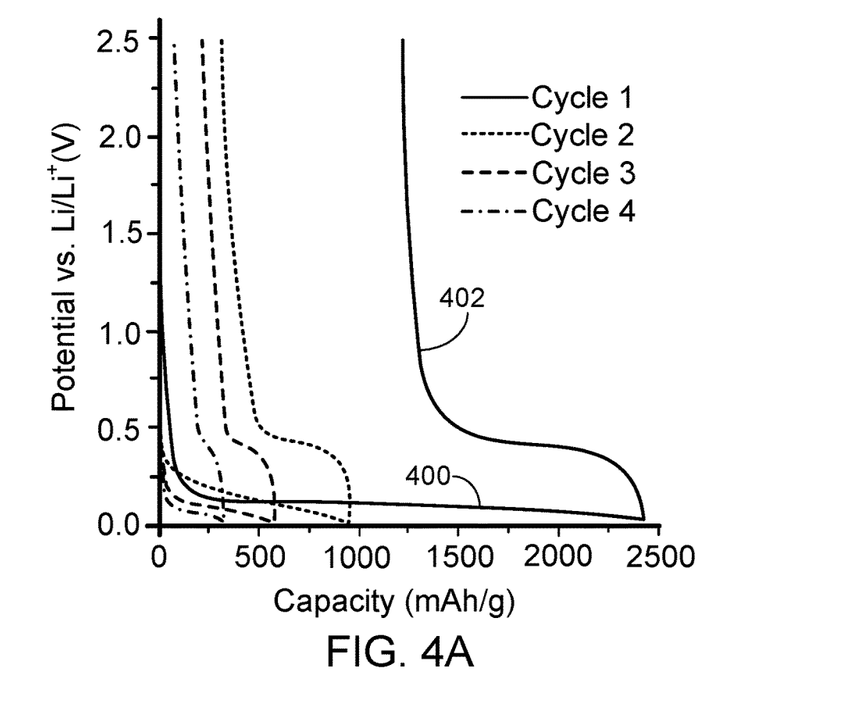
FIG. 4A shows voltage versus capacity determined by potentiodynamic cycling of a clathrate film prepared according to the Example with a 25 µA mg$^{-1}$ threshold current.
Figure 4B:
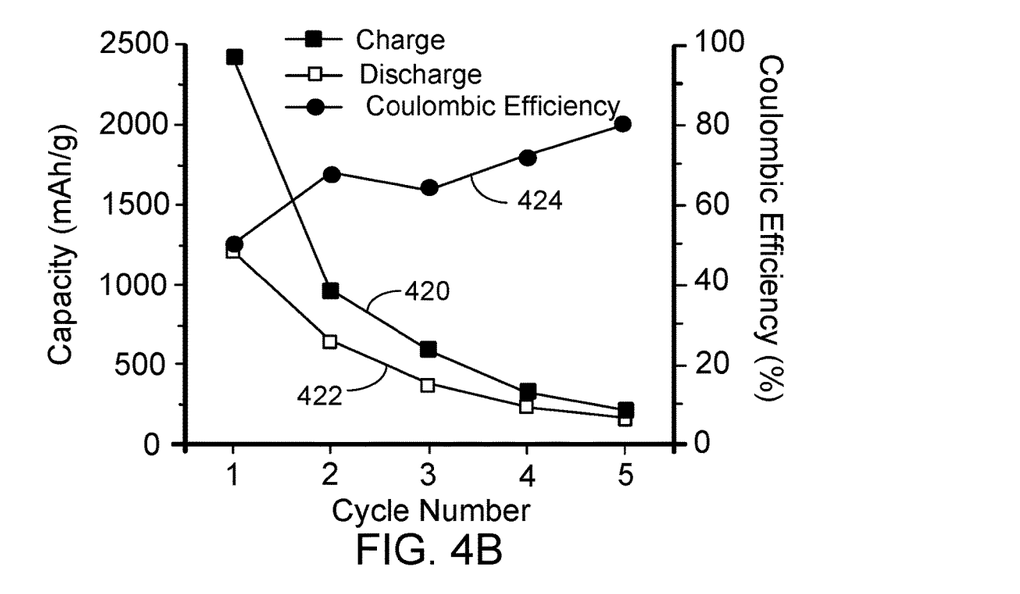
FIG. 4B shows capacity and Coulombic efficiency of the clathrate film.

Potentiodynamic cycling of the clathrate films was performed in order to understand the basic electrochemical processes occurring in the electrodes during lithium insertion (charge) and de-insertion (discharge) in half-cells with Li metal counter electrodes. The cycling results using a 25 µA/mg threshold current are shown in FIG. 4A. The first charge curve 400 was characterized by a flat plateau at around 0.120 V vs. $Li/Li^+$. However, since the XRD patterns showed that c-Si was etched away, and no features consistent with lithiation of a-Si were observed, these electrochemical features are likely from the reaction of Li with the clathrates. The discharge curve 402 showed a flat plateau at 0.425 V and was a similar shape to that observed in delithiation of c-$Li_{15}Si_4$, although at a slightly lower voltage. As shown in FIG. 4B, the first charge capacity was 2431 mAh/g (cycle number 1 in charge curve 420) and the discharge capacity was 1213 mAh/g (cycle number 1 in discharge curve 422), resulting in a Coulombic efficiency (CE) of about 50% (cycle number 1 in CE curve 424). These results show discharge of lithiated clathrate.

Figure 5A:
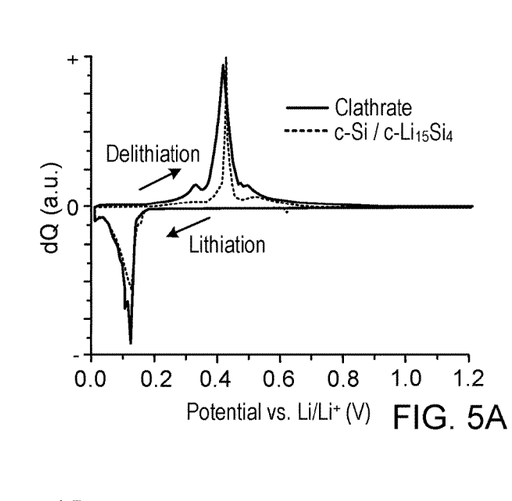
Figure 5B:
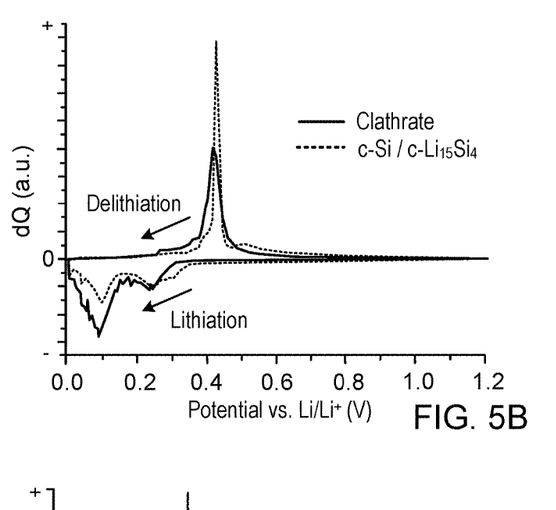

To better understand the lithiation and delithiation features of the Na-filled silicon clathrate, the differential charge (dQ) vs. potential plots were obtained and compared to those for c-Si, with plots 500 and 502 showing delithiation and lithiation, respectively, for the clathrate, and plots 504 and 506 showing delithiation and lithiation, respectively, for c-Si/c-Li$_{15}$Si$_4$. FIGS. 5A and 5B show the first and second cycle, respectively, for the electrode cycled using a 25 µA/mg threshold current. Due to the differences in observed capacities, the values of the dQ were scaled in order to clearly distinguish the differences between the two materials. Overall, the dQ plots of the clathrates look very similar to those for c-Si. Delithiation of c-Li$_{15}$Si$_4$ occurs as a two-phase reaction to form amorphous Si (a-Si) at the end of the discharge. These two-phase reactions are observed as peaks in the dQ vs. potential plots.

Figure 5C:
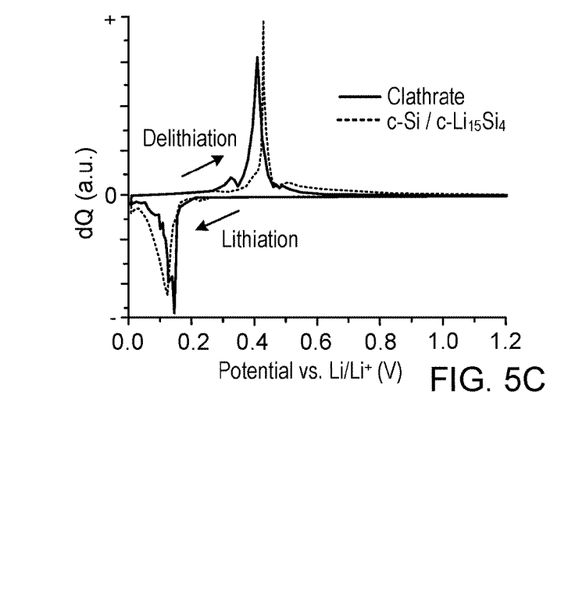
Figure 5D:
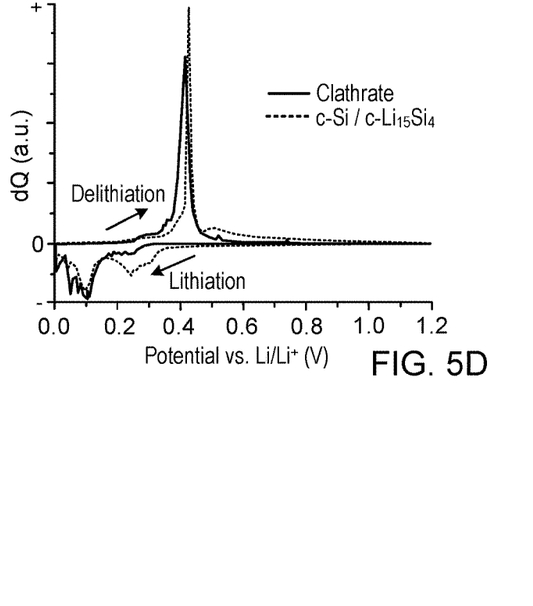

The similar shape of the dQ plots for the clathrates suggest a similar reaction mechanism. One difference between the clathrate dQ plots and those for delithiation of c-Li$_{15}$Si$_4$ is that the discharge was observed over a broader range of potentials for the clathrate. There is also a notable peak at 0.3 V vs. Li/Li$^+$ in the discharge which is not seen in delithiation of c-Li$_{15}$Si$_4$. The second charge of the clathrate (FIG. 5B) showed two broad peaks, which are similar to those seen in lithiation of a-Si although at slightly lower potentials. When performing cycling with a 5 µA/mg threshold current (FIGS. 5C-5D), the voltage hysteresis between the charge and discharge decreased from 0.28 V when using 25 µA/mg to 0.25 V, but the other features remained substantially the same.

Figure 6A:
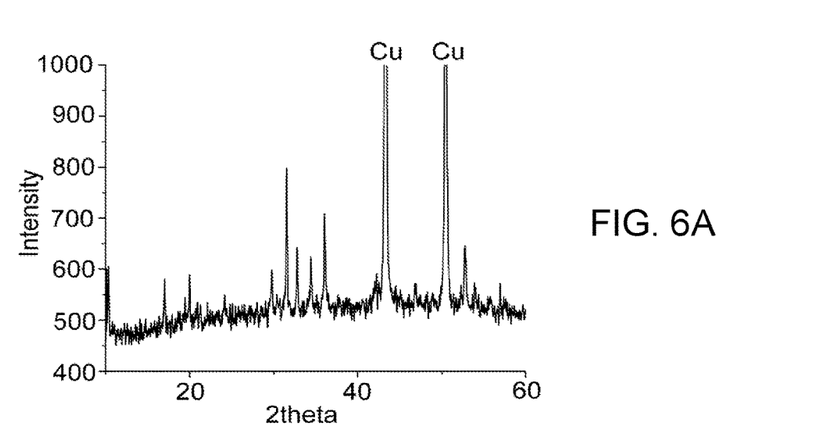
FIGS. 6A-6C show XRD patterns of clathrate films on Cu prior to cycling (FIG. 6A), after lithiation (FIG. 6B), and after lithiation and delithiation (FIG. 6C). The insets in FIGS. 6B and 6C show the corresponding galvanostatic cycling curves.
Figure 6B:
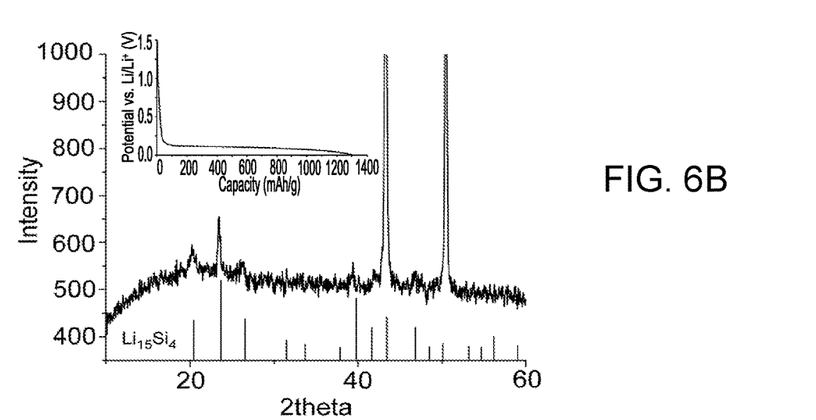

To confirm the amorphization process, ex situ XRD measurements were performed on the cells after galvanostatic cycling using a current of 25 µA/mg. The peaks attributed to the unlithiated clathrate (FIG. 6A) were observed to decrease in intensity after lithiation to about 1300 mAh/g (FIG. 6B), confirming the amorphization process. This capacity corresponds to about 184 Li inserted into the clathrate (or ~1.6 Li/Si), assuming a composite anode of Type I and Type II clathrate with total molecular weight of approximately 3790 g/mol based on the phase fraction obtained from the Rietveld analysis. Several reflections corresponding to c-Li$_{15}$Si$_4$ were also observed (FIG. 6B).

Figure 6C:
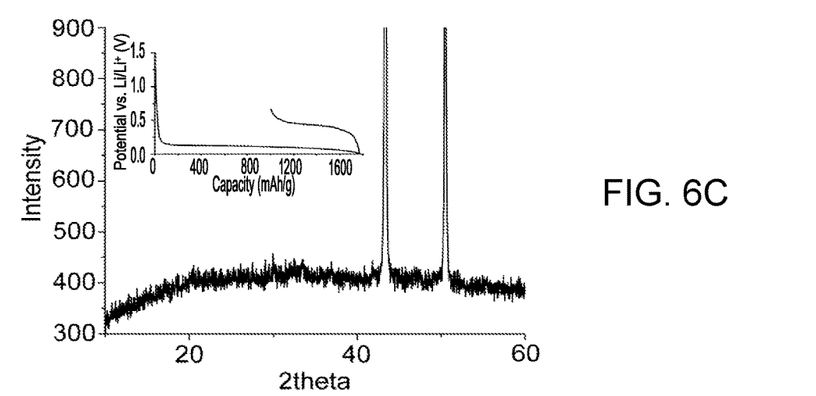

For a sample that was lithiated to 1770 mAh/g and then partially discharged, the c-Li$_{15}$Si$_4$ peaks disappeared and no new reflections were observed (FIG. 6C), indicating that the material transformed into an amorphous phase during delithiation of c-Li$_{15}$Si$_4$. These results are consistent with the observed electrochemical characteristics. SEM imaging of samples after 10 cycles showed the clathrate particles were covered with an SEI layer, but no obvious pulverization or cracks were observed in the particles.

To better understand the amorphization process, first principles density functional theory (DFT) was used to calculate the lattice constant and energy of formation for several structures using the VASP code (G. Kresse et al., *Phys. Rev. B* 1996, 54, 11169; J. P. Perdew et al., *Phys. Rev. Lett.* 1996, 77, 3865). The Perdew, Burke and Ernzerhof (PBE) functional and projector-augmented wave (PAW) potentials were used along with the plane wave basis sets (G. Kresse et al., *Phys. Rev. B* 1999, 59, 1758-1775). The energy cutoff for the plane wave basis set was 300 eV. The convergence criteria for energy and forces were set to be 0.01 meV and 0.1 meV respectively. The Si 3s3p, Na 2p3s, Li 1s2s electrons were treated as valence electrons. The formation energies were calculated by subtracting the total energies of the elements from the energy of the structure, then dividing by the total number of atoms. For example, the formation energy for Si$_{136}$ was calculated using Eqn. 1 and that for Li$_{16}$Na$_{24}$Si$_{136}$ was calculated using Eqn. 2, where E(Si), E(Li), and E(Na) are the energies per atom for c-Si, Li and Na metals, respectively.

$$E_{form} = \frac{E(Si_{136}) - 136E(Si)}{136} \quad (1)$$

$$E_{form} = \frac{E(Li_{16}Na_{24}Si_{136}) - 16E(Li) - 24E(Na) - 136E(Si)}{176} \quad (2)$$

The results for Si$_{136}$, Na$_{24}$Si$_{136}$, Na$_8$Si$_{46}$, Li$_{24}$Si$_{136}$, Li$_{16}$Na$_{24}$Si$_{136}$, and Li$_{15}$Si$_4$ are shown in Table 3. Although the calculated formation energies for Na$_8$Si$_{46}$ and empty Si$_{136}$ were slightly positive, both structures have been experimentally synthesized. Note that the calculated formation energies are based on the total energies predicted by DFT at the ground state, i.e. 0 K, so the calculated values are reasonable. The formation energy for fully-filled Na$_{24}$Si$_{136}$ was −0.005 eV/atom, suggesting it is the more stable structure compared to empty Si$_{136}$.

TABLE 3

| Calculated properties using DFT | | |
|---|---|---|
| Compound | Lattice constant (Å) | Formation Energy (eV/atom) |
| Si$_{136}$ | 14.74 | 0.052 |
| Na$_8$Si$_{46}$ | 10.24 | 0.002 |
| Na$_{24}$Si$_{136}$ | 14.78 | −0.005 |
| Li$_{24}$Si$_{136}$ | 14.68 | 0.030 |
| Li$_{16}$Na$_{24}$Si$_{136}$ | 14.95 | 0.012 |
| Li$_{16}$Na$_{24}$Si$_{136}$' | 14.90 | −0.002 |
| Li$_{16}$Na$_{24}$Si$_{136}$'' | 14.90 | −0.003 |
| Li$_{15}$Si$_4$ | 10.54 | −0.239 |

To model lithiated clathrate, the Type II structure was considered since the synthesized powders were predominately this phase. Type II clathrate crystallizes in the Fd$\bar{3}$M space group, with Si occupying the 8a, 32e, and 96g sites and Na in the 8b and 16c sites, as described with Wyckoff symmetry notation. Replacing the Na with Li to form Li$_{24}$Si$_{136}$ resulted in a formation energy of 0.030 eV/atom, which is higher than that for Na$_{24}$Si$_{136}$. This is likely due to the ability of Na to better stabilize the clathrate structure due to its larger size. Despite this slightly positive formation energy, electrochemical Li insertion into the empty Na sites of type II clathrate has been confirmed with NMR, as described by T. Langer et al., J. Electrochem. Soc. 2012, 159, A1318-A1322.

Figure 7A:
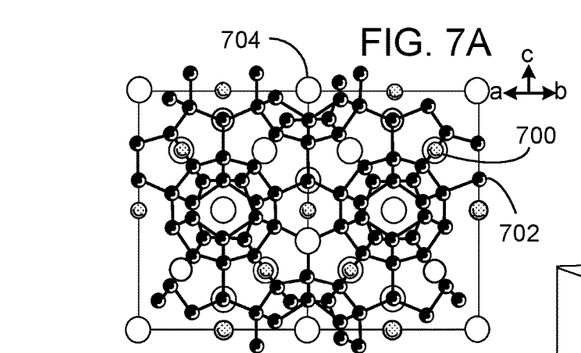
Figure 7B:
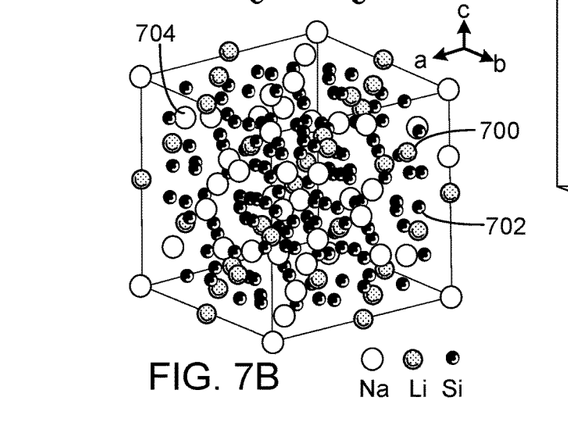
Figure 7C:
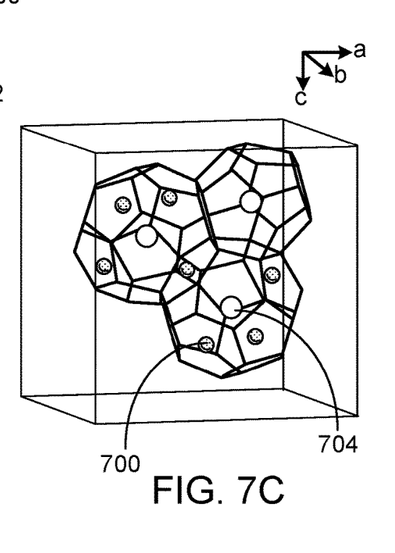
FIG. 7C depicts a unit cell for $Li_{16}Na_{24}Si_{136}$ showing arrangement of Li atoms on hexagon faces separating the $Si_{28}$ cages. Several cages were deleted for clarity.

Lithiation of Na-filled Type II clathrate was first modeled by placing Li 700 into the 16d sites, which are typically unoccupied in Type II clathrate, to form Li$_{16}$Na$_{24}$Si$_{136}$ (FIGS. 7A and 7B). The Si$_{28}$ polyhedra in Type II clathrate are composed of 12 pentagonal and 4 hexagonal faces. Occupancy of the 16d sites by Li 700 places them on the faces of the hexagons, equidistant from each Si 702, such that they are bisected and shared by neighboring Si$_{28}$ clusters (FIG. 7C). In this configuration, the Li are located in channels along the <110> directions parallel to the rows of Na 704 ions occupying the 16c sites. The Li—Si and Na—Li bond lengths were 2.454 and 3.237 Å, respectively, in this structure. The formation energy for this structure was 0.012 eV/atom, lower than that for Li$_{24}$Si$_{136}$. These results suggest that lithiation into Na-filled clathrate is not less favourable than lithiation into empty clathrate.

Figure 7D:
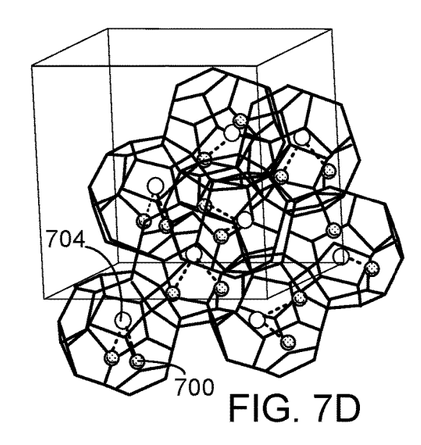
FIG. 7D depicts a unit cell for $Li_{16}Na_{24}Si_{136}'$ and FIG. 7E depicts $Li_{16}Na_{24}Si_{136}''$ showing all eight $Si_{28}$ cages. $Si_{20}$ cages were deleted for clarity. Na atoms are labeled and Na—Li bonds indicated by dashed lines.
Figure 7E:
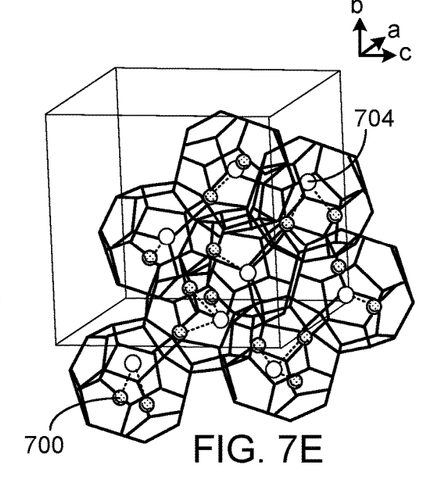

Next, the positions of the Li were displaced slightly from the 16d sites so that they were no longer sitting in the hexagonal faces, but rather inside the Si polyhedra. In the first structure, referred to as Li$_{16}$Na$_{24}$Si$_{136}$', 2 Li atoms were placed inside the Si$_{28}$ cages so they shared the interstitial space with the Na atoms (FIG. 7D). The second structure, referred to as $Li_{16}Na_{24}Si_{136}''$, had the Li atoms distributed amongst the eight $Si_{28}$ cages of the unit cell in the following manner: two cages had 1 Li, two cages had 3 Li, and the remaining 4 cages had 2 Li sharing the cage volume with the Na (FIG. 7E). The calculated Na atomic coordinates for both structures showed that the Na positions were shifted away from the centres of the cages in order to accommodate the Li atoms. Both structures had negative formation energies (Table 3) and shorter bond lengths than in the original $Li_{16}Na_{24}Si_{136}$ structure, with the shortest bond length of 2.837 Å calculated in $Li_{16}Na_{24}Si_{136}''$, as shown in Table 4.

TABLE 4

DFT calculated Na—Li bond distances associated with $Si_{26}$ cages in different $Li_{16}Na_{24}Si_{136}$ structures.

| Structure | Atom pair | Bond length (Å) |
|---|---|---|
| $Li_{16}Na_{24}Si_{136}$ | Na—Li | 3.237 |
| $Li_{16}Na_{24}Si_{136}'$ | Na1—Li12 | 2.939 |
| | Na1—Li14 | 2.928 |
| | Na2—Li1 | 2.960 |
| | Na2—Li2 | 2.954 |
| | Na3—Li3 | 2.935 |
| | Na3—Li8 | 2.951 |
| | Na4—Li4 | 2.928 |
| | Na4—Li15 | 2.932 |
| | Na5—Li5 | 2.934 |
| | Na5—Li10 | 2.939 |
| | Na6—Li6 | 2.942 |
| | Na6—Li7 | 2.924 |
| | Na7—Li9 | 2.934 |
| | Na7—Li11 | 2.930 |
| | Na8—Li13 | 2.937 |
| | Na8—Li16 | 2.927 |
| $Li_{16}Na_{24}Si_{136}''$ | Na1—Li12 | 3.099 |
| | Na2—Li1 | 2.929 |
| | Na2—Li2 | 2.887 |
| | Na3—Li3 | 2.899 |
| | Na3—Li8 | 2.899 |
| | Na3—Li13 | 2.837 |
| | Na4—Li4 | 2.920 |
| | Na4—Li15 | 2.927 |
| | Na5—Li10 | 3.110 |
| | Na6—Li6 | 2.946 |
| | Na6—Li7 | 2.926 |
| | Na7—Li9 | 2.924 |
| | Na7—Li11 | 2.920 |
| | Na8—Li5 | 2.886 |
| | Na8—Li14 | 2.884 |
| | Na8—Li16 | 2.896 |

These results suggest that it is energetically feasibly for more than one guest atom to occupy the space inside the $Si_{28}$ cage of Type II clathrate while maintaining the overall Si clathrate framework structure. The lattice constants for all of the lithiated Type II clathrate structures increased very slightly compared to the empty $Si_{136}$. This suggests that at the initial stages of Li insertion, the clathrate structure may be maintained. However, with more Li insertion, the experimental results show that transformation into an amorphous lithium and sodium containing silicide is more favorable. The formation energy of $c-Li_{15}Si_4$ was calculated to be −0.239 eV/atom. The very low energy for this phase may explain why lithiation of both empty and Na-filled clathrate eventually result in transformation to $c-Li_{15}Si_4$.

In summary, electrochemical and XRD analysis of lithium insertion into a mixture of Na-filled Type I and Type II clathrates showed a similar reaction mechanism in these materials as is found in diamond cubic silicon. Upon electrochemical lithiation, the clathrates became amorphous and transformed to $c-Li_{15}Si_4$ at low potentials, then remained an amorphous silicide after delithiation. DFT was used to calculate the lattice constants and formation energies for various Type II clathrate structures. The results showed that 16 Li atoms could be inserted per unit cell with very little increase in lattice constant. The DFT-predicted structures for $Li_{16}Na_{24}Si_{136}$ containing multiple-guest atoms inside the larger $Si_{28}$ cages shows that these configurations are energetically favorable and suggests that such lithiation processes can occur without significant changes in lattice constant or clathrate structure.

A number of embodiments of the invention have been described. Nevertheless, it will be understood that various modifications may be made without departing from the spirit and scope of the invention. Accordingly, other embodiments are within the scope of the following claims.

What is claimed is:

1. An anode for a rechargeable battery, the anode comprising a Type II clathrate having the formula $M_xX_{136}$, wherein:
    a cage structure is formed by X,
    M represents one or more guest ions, and
    $0 \leq x \leq 24$.

2. The anode of claim 1, wherein X is selected from the group consisting of Si, Ge, and Sn.

3. The anode of claim 1, wherein M is an ion selected from the group consisting of ions of Na, K, Rb, Cs, Ba, Sr, Ca, Cl, Br, I, Eu, P, Te, Li, and Mg.

4. The anode of claim 1, wherein $M_xX_{136}$ represents $A_yB_zX_{136}$, wherein A and B represent different guest ions, $1 \leq y+z \leq 24$, $y \geq 1$, and $x \geq 1$.

5. The anode of claim 4, wherein A and B are independently selected from the group consisting of ions of Na, K, Rb, Cs, Ba, Sr, Ca, Cl, Br, I, Eu, P, Te, Li, and Mg.

6. A rechargeable battery comprising the anode of claim 1.

7. The rechargeable battery of claim 6, further comprising:
    a cathode; and
    an electrolyte in contact with the anode and the cathode.

8. A device comprising the rechargeable battery of claim 7.

9. A method of forming an anode for a rechargeable battery, the method comprising:
    preparing a composition comprising a Type II clathrate having the formula $M_xX_{136}$, wherein the cage structure is formed by X, M represents one or more guest ions, and $0 \leq x \leq 24$; and
    contacting the composition with a current collector to form the anode.

10. The method of claim 9, wherein X is selected from the group consisting of Si, Ge, and Sn.

11. The method of claim 9, wherein M is an ion selected from the group consisting of ions of Na, K, Rb, Cs, Ba, Sr, Ca, Cl, Br, I, Eu, P, Te, Li, and Mg.

12. The method of claim 9, wherein $M_xX_{136}$ represents $A_yB_zX_{136}$, A and B represent different guest ions, $1 \leq y+z \leq 24$, $y \geq 1$, and $x \geq 1$.

13. The method of claim 12, wherein A and B are independently selected from the group consisting of ions of Na, K, Rb, Cs, Ba, Sr, Ca, Cl, Br, I, Eu, P, Te, Li, and Mg.

14. An anode for a rechargeable battery formed by the method of claim 9.

15. A rechargeable battery comprising the anode formed by the method of claim 9.

16. The rechargeable battery of claim 15, wherein the rechargeable battery is selected from the group consisting of a rechargeable sodium-ion battery, a rechargeable magnesium-ion battery, and a rechargeable lithium-ion battery.

17. A device comprising the rechargeable battery of claim 15.

18. A method comprising:
electrochemically inserting a guest ion Y into a cage structure of a Type II clathrate having the formula $M_xX_{136}$ to yield a Type II clathrate having the formula $M_xYX_{136}$, wherein:
the cage structure is formed by X,
M represents one or more guest ions, and
$0 \leq x \leq 24$; and
electrochemically removing Y from the Type II clathrate.

19. The method of claim 18, wherein Y is selected from the group consisting of sodium ions, magnesium ions, and lithium ions.

20. The method of claim 18, wherein X is selected from the group consisting of Si, Ge, and Sn.

21. The method of claim 18, wherein M is an ion selected from the group consisting of ions of Na, K, Rb, Cs, Ba, Sr, Ca, Cl, Br, I, Eu, P, Te, Li, and Mg.

22. The method of claim 18, wherein Y is a lithium ion, and electrochemically inserting and removing comprise lithiation and delithiation, respectively.

* * * * *